(12) United States Patent
Bai et al.

(10) Patent No.: US 8,451,445 B2
(45) Date of Patent: May 28, 2013

(54) APPARATUS AND METHOD FOR DETECTING ARRAY SUBSTRATE

(75) Inventors: Guoxiao Bai, Beijing (CN); Chao Tian, Beijing (CN)

(73) Assignee: Beijing BOE Optoelectronics Technology Co., Ltd., Beijing (CN)

( * ) Notice: Subject to any disclaimer, the term of this patent is extended or adjusted under 35 U.S.C. 154(b) by 325 days.

(21) Appl. No.: 12/907,416

(22) Filed: Oct. 19, 2010

(65) Prior Publication Data

US 2011/0090502 A1    Apr. 21, 2011

(30) Foreign Application Priority Data

Oct. 21, 2009    (CN) .......................... 2009 1 0236438

(51) Int. Cl.
*G01J 4/00*    (2006.01)
(52) U.S. Cl.
USPC ............................................ 356/364; 349/96
(58) Field of Classification Search
USPC .......................................... 356/364; 349/96
See application file for complete search history.

(56) References Cited

U.S. PATENT DOCUMENTS

| | | | |
|---|---|---|---|
| 7,113,278 B2 * | 9/2006 | Choo et al. ..................... | 356/364 |
| 7,304,746 B2 * | 12/2007 | Cottrell ......................... | 356/495 |
| 7,576,818 B2 * | 8/2009 | Tsuchiya et al. .............. | 349/114 |
| 7,639,360 B2 * | 12/2009 | Wu et al. ....................... | 356/364 |
| 8,223,333 B2 * | 7/2012 | Kim ............................... | 356/364 |
| 2009/0086137 A1 | 4/2009 | Horiguchi et al. | |

FOREIGN PATENT DOCUMENTS

| | | |
|---|---|---|
| CN | 1534365 A | 10/2004 |
| CN | 101403828 A | 4/2009 |

* cited by examiner

*Primary Examiner* — Layla Lauchman
(74) *Attorney, Agent, or Firm* — Ladas & Parry LLP

(57) ABSTRACT

An apparatus for detecting an array substrate comprises: a transparent carrier for supporting an array substrate to be detected thereon; a light source disposed on one side of the transparent carrier; and a modulator disposed on the other side in parallel with the transparent carrier. The modulator comprises a liquid crystal layer and two transparent substrate layers disposed on both sides of the liquid crystal layer, and one transparent substrate layer away from the transparent carrier is a first transparent conductive substrate layer, and a second polarizer is disposed thereon. A first polarizer is disposed between the light source and the transparent carrier, so that the light emitted from the light source is transmitted through the first polarizer to the transparent carrier. A light receiver receives the light emitted from the light source and then transmitted through the transparent carrier, the array substrate and the modulator.

16 Claims, 4 Drawing Sheets

APPARATUS AND METHOD FOR DETECTING ARRAY SUBSTRATE

BACKGROUND

Embodiments of the present invention relate to an apparatus and a method for detecting an array substrate.

At present, detecting apparatuses for a thin film transistor (TFT) array substrate in a liquid crystal display can be classified into two types: an electrical detecting apparatus type and an optical detecting apparatus type.

An electrical detecting apparatus may comprise a light source 102, a modulator 103 and a light receiver 105. As shown in FIG. 1, during the detecting process, an electric field is formed between a TFT array substrate 101 to be detected and the modulator 103 when electrical signals are applied to the pixels on the TFT array substrate 101. Light emitted from the light source 102 travels through the liquid crystal layer in the modulator 103 and then reaches a reflective thin film 104 on the modulator 103. At this time, the liquid crystal molecules in the liquid crystal layer in the modulator 103 are differently oriented based on the magnitude of the electric field formed therebelow. As the orientation angles of the liquid crystal molecules are varied, the amount of the light reflected back is varied. Then, the light receiver 105 (e.g., a camera) senses the reflected light and performs the analysis on sensed signals to determine whether a defect occurs based on the different intensity of the reflected light.

More specifically, the structure of the modulator 103 of the above-described electrical detecting apparatus for a TFT array substrate is shown in FIG. 2, and the modulator 103 comprises four layers: a transparent white glass layer 201, an ITO (indium tin oxide) conductive layer 202, a liquid crystal molecule layer 203 and a reflective thin film layer 204. The operating mechanism thereof is explained with reference to FIG. 3. In on example, when a voltage of 250V~300V is applied to the ITO conductive layer 202 of the modulator 103 and a voltage of −18V~30V is applied to the pixel electrodes on the TFT array substrate 101, an electric field is then generated between the modulator 103 and the TFT array substrate 101, and the liquid crystal molecules are oriented to align uniformly under the electric field to allow light to transmit. When testing signals are applied to the TFT array substrate 101, if a certain TFT device malfunctions, the intensity of the electric field formed thereabove may be decreased, and thus the orientation angles of the liquid crystal molecules may vary and the intensity of the light reflected back may be decreased.

An optical detecting apparatus is operated by irradiating light on a TFT array substrate, receiving light with a camera and the then analyzing the received signals. A defect pixel can be determined based on variation of the gray value of the light passing through the pixel compared with a normal value.

However, it has been found that there are at least following problems in the above conventional electrical detecting apparatus for a TFT array substrate. The electrical detecting apparatus determines a defect through sensing variation of the generated electric field, but some kinds of defects do not affect the electrical characteristics of a pixel but affect the aperture ratio of the pixel and thus cannot be detected by the electrical detecting apparatus. On the other hand, the optical detecting apparatus can only detect a surface defect of the pixel but cannot detect an electric defect. Therefore, two types of detecting apparatuses are needed to detect the kinds of defects of a TFT array substrate, resulting in a complex detecting procedure and a low detecting efficiency.

SUMMARY

One embodiment of the present invention discloses an apparatus for detecting an array substrate comprising: a transparent carrier for supporting an array substrate to be detected thereon; a light source disposed on one side of the transparent carrier; a modulator disposed on the other side of the transparent carrier in parallel with the transparent carrier, and comprising a liquid crystal layer and two transparent substrate layers disposed on both sides of the liquid crystal layers, wherein one transparent substrate layer away from the transparent carrier is a first transparent conductive substrate layer, and a second polarizer is disposed on the first transparent conductive substrate layer; a first polarizer disposed between the light source and the transparent carrier, so that the light emitted from the light source is transmitted through the first polarizer to radiate on the transparent carrier; and a light receiver receiving the light emitted from the light source and then transmitted through the transparent carrier, the array substrate to be detected and the modulator.

Another embodiment of the present invention discloses a method for detecting an array substrate comprising: loading an array substrate to be detected on a transparent carrier; providing a light source on one side of the transparent carrier and a first polarizer between the light source and the transparent carrier; providing a modulator on the other side of the transparent carrier in parallel with the transparent carrier, the modulator comprising a liquid crystal layer and two transparent substrate layers disposed on both sides of the liquid crystal layers, wherein one transparent substrate layer away from the transparent carrier is a first transparent conductive substrate layer, and a second polarizer is disposed on the first transparent conductive substrate layer; forming an electric field in a space in which the modulator is disposed to orient liquid crystal molecules in the liquid crystal layer; transmitting the light emitted from the light source through the first polarizer to vertically radiate on the transparent carrier; and receiving the light transmitted through the transparent carrier, the array substrate to be detected and the modulator.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION

Embodiments of the present invention now will be described more fully hereinafter with reference to the accompanying drawings, in which the embodiments of the invention are shown, but only some embodiments of the present invention are described here. Other embodiments completed by those skilled in the relevant art based on the embodiments disclosed herein without any inventive work all fall within the protection scope of the present invention.

Figure 1:
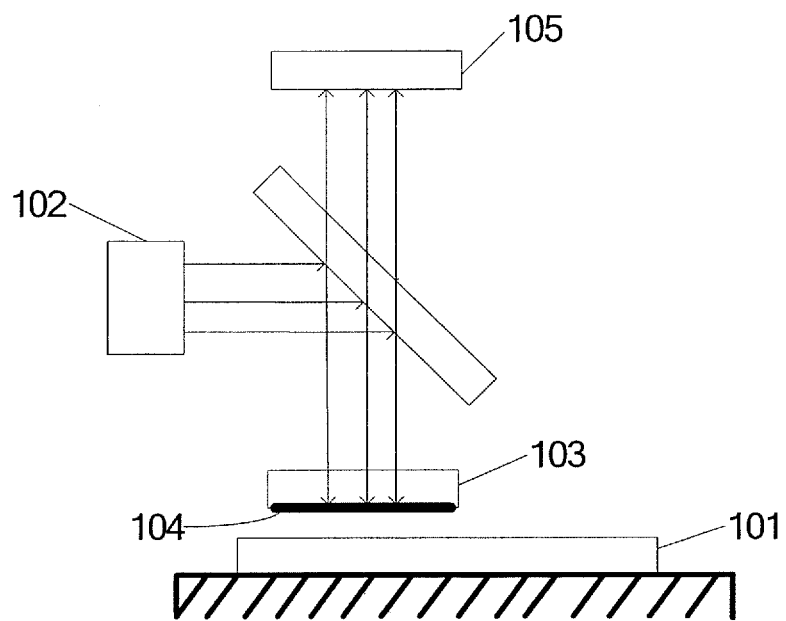
FIG. 1 is a schematic view of a conventional electrical detecting apparatus.
Figure 2:
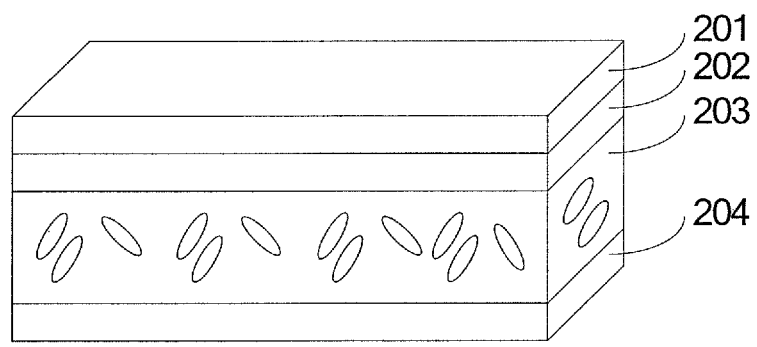
FIG. 2 is a structural schematic view of a conventional modulator.
Figure 3:
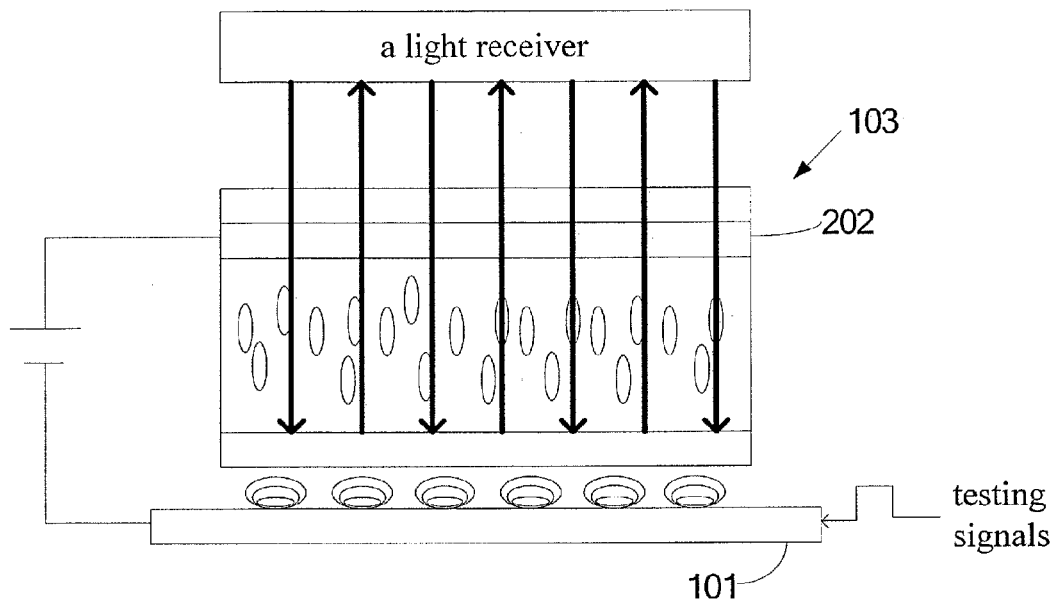
FIG. 3 is a schematic view of the detecting mechanism of a conventional electrical detecting method.
Figure 4:
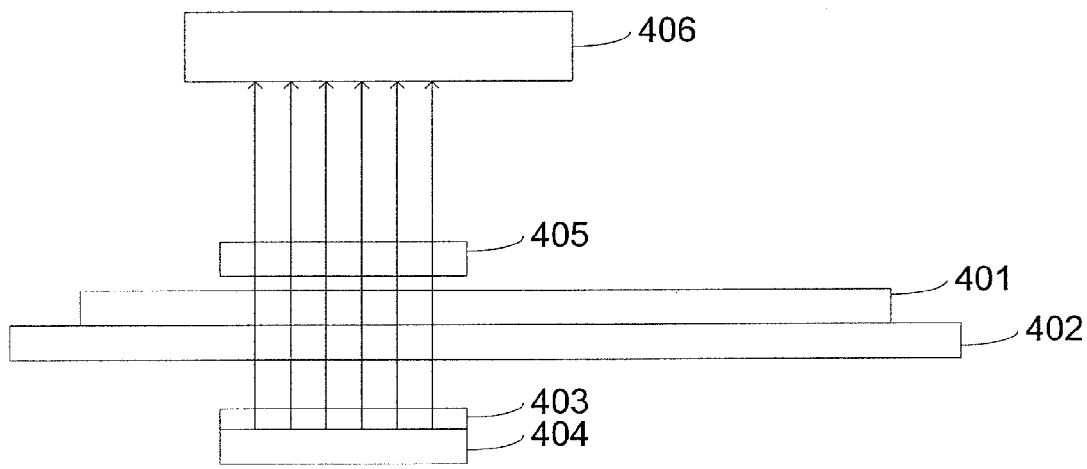
FIG. 4 is a schematic view of an apparatus for detecting a TFT array substrate according to an embodiment of the present invention.

As shown in FIG. 4, a detecting apparatus for an array substrate (e.g., a TFT array substrate) provide by an embodiment of the present invention comprises: a transparent carrier 402, a light source 404, a modulator 405 and a light receiver (e.g., camera) 406.

The transparent carrier 402 for supporting a TFT array substrate 401 to be detected thereon is horizontally disposed, on which the TFT array substrate 401 to be detected has been disposed. The light source 404 is disposed below the transparent carrier 402, and the light emitted from the light source 404 is transmitted through a first polarizer 403 and then perpendicularly radiated onto the transparent carrier 402. The light source 404 may be a back light for a LCD, and the first polarizer 403 is attached to the light source 404. After traveling through the first polarizer 403, the light emitted from the light source 404 can be changed into the parallel light with the same polarizing angle. The modulator 405 parallel to the transparent carrier 402 is disposed over the transparent carrier 402.

The light emitted from the light source 404 is transmitted sequentially through the first polarizer 403, the transparent carrier 402, the TFT array substrate 401 to be detected and the modulator 405, and finally reaches the light receiver 406.

Figure 5:
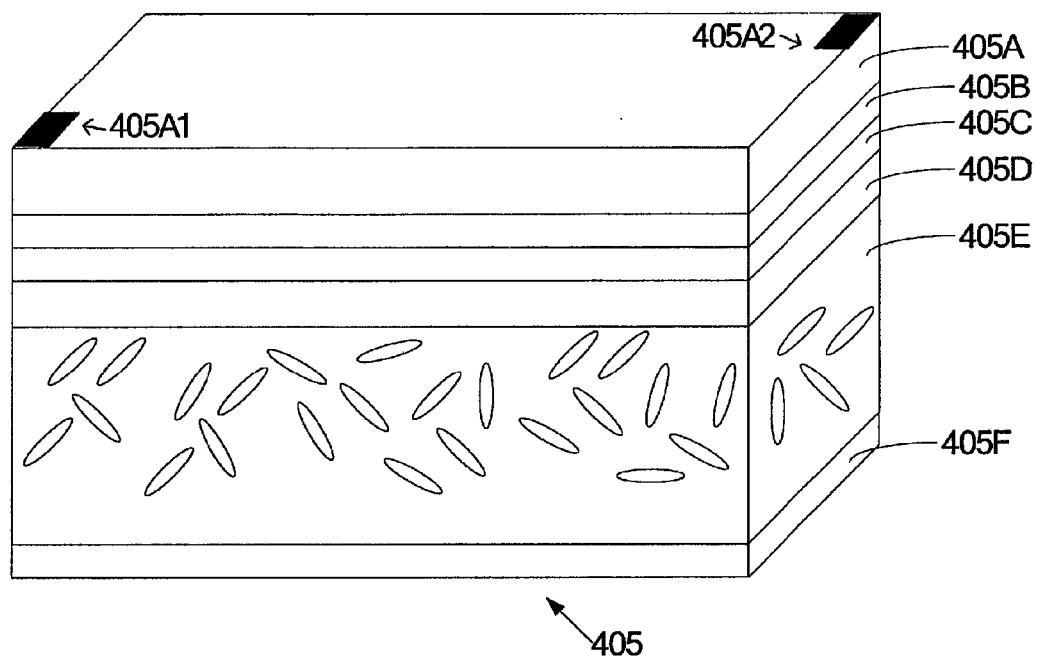
FIG. 5 is a structural schematic view of a modulator according to the embodiment of the present invention.

As shown in FIG. 5, the modulator 405 can have a cuboid outer profile and comprises, from up-to-down, a transparent glass layer 405A, a second polarizer 405B, a first transparent substrate layer 405C, a liquid crystal layer 405E and a second transparent substrate layer 405F. The first transparent substrate layer 405C is a transparent conductive substrate layer and, in the present embodiment, is a transparent glass for example. On one side of the first transparent substrate layer 405C, there may be further provided a transparent conductive layer 405D (for example, an ITO layer). The second transparent substrate layer 405F is for example a transparent white glass in the present embodiment.

The relative positions of the second polarizer 405B, the first transparent substrate layer 405C and the ITO layer 405D can be suitably changed as necessary; for example, the second polarizer 405B and the ITO layer 405D may be disposed not only on two opposite sides but also on the same one side of the first transparent substrate layer 405C, or the positions of the second polarizer 405B and the ITO layer 405D can be exchanged.

In addition, alignment layers (not shown) may be formed on opposite sides of the liquid crystal layer 405E to sandwich the liquid crystal layer 405E, such that the liquid crystal molecules can be pre-aligned.

Electrodes 405A1 and 405A2 can be provided on the transparent glass layer 405A to connect to the ITO layer 405D so as to apply a voltage to the ITO layer 405D. However, the electrodes 405A1 and 405A2 connected to the ITO layer 405D may not provided on the transparent glass layer 405A, and thus the voltage is directly applied to the ITO layer 405D.

The relationship between the second polarizer 405B and the first polarizer 403 can be: a polarization direction of the polarized light transmitted through the first polarizer 403 is the same as that of the polarized light transmitted through the second polarizer 405B. The first and second polarizers may be embodied by the polarizer used for a conventional liquid crystal display.

Figure 6:
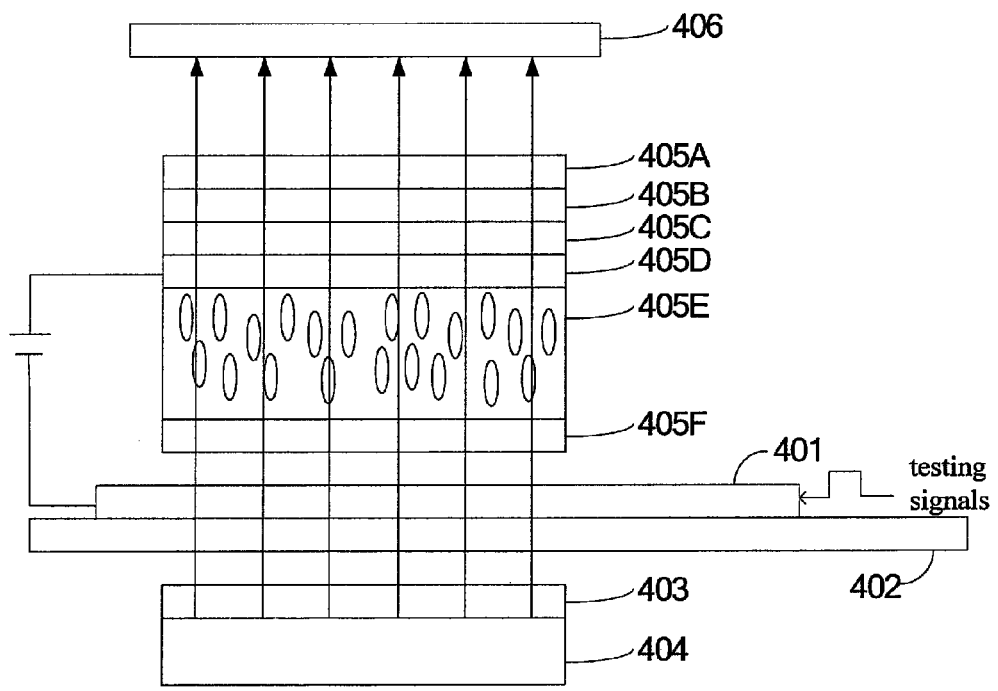
FIG. 6 is a schematic view of the detecting mechanism of a detecting method according to the embodiment of the present invention.

The detecting process and detecting mechanism will be described with reference to FIG. 6. The TFT array substrate 401 to be detected is disposed on the transparent carrier 402, and the modulator 405 is moved from an original position to a detecting position at a determined distance (e.g., 20 micrometers) away from the TFT array substrate 401. Then, a voltage of 250V~300V is applied to the ITO layer 405D via the electrodes 405A1 and 405A2 over the ITO layer 405D of the modulator 405, and a voltage of −18V~30V is applied to the pixel electrodes of the TFT array substrate 401. Thus, an electric field with the voltage drop of 250V~270V is generated between the modulator 405 and the pixel electrodes of the TFT array substrate 401, and the liquid crystal molecules in the liquid crystal layer 405E of the modulator 405 are oriented to align uniformly under the electric field so as to allow light to transmit. As a result, the light emitted from the light source 404 passes through the first polarizer 403 and is changed into the parallel light with the same polarizing angles, and then the light passes through the transparent carrier 402, the TFT array substrate 401, the transparent conductive substrate layer 405F of the modulator 405, the liquid crystal layer 405E (with the liquid crystal molecules aligned uniformly) and the second polarizer 405B sequentially, and finally reaches the light receiver 406.

When testing signals are inputted into gate lines and data lines of the TFT array substrate 401, if an electric defect occurs in a pixel electrode at a certain position on the TFT array substrate 401, the intensity of the electric field at the certain position may vary, and thereby the orientation of the liquid crystal molecules in the liquid crystal layer 405E of the modulator 405 thereabove is changed, and the light cannot be transmitted normally. Because of the same polarization directions of the polarized light transmitted through the first polarizer 403 and the polarized light transmitted through the second polarizer 405B, the light cannot be transmitted through the second polarizer 405B after traveling through the liquid crystal molecules, and thus, the light intensity at the certain position sensed by the light receiver 406 is different from the normal light intensity at other positions. The signals collected by the light receiver 106 can be processed with a computer or the like, such that the position of the defect in TFT array substrate 401 can be detected.

On the other hand, if an optical defect occurs in a pixel of the TFT array substrate 401, the orientation angles of the liquid crystal molecules thereabove are not influenced, but the aperture ratio of the pixel may be affected. When the light emitted from the light source 404 passes through the pixel with the optical defect, light transmittance amount may be more or less than the normal light transmittance amount, and thus, the light intensity sensed by the light receiver 406 may vary, and then, with a computer or the like, the position of the optical defect in the TFT array substrate 101 to be detected can be determined based on the sensed light intensity.

Therefore, by using only one detecting apparatus, the electric defect and/or the optical defect of a TFT array substrate can be detected, which simplifies the detecting procedures and improves the detecting efficiency.

The structure of an apparatus for detecting a TFT array substrate provided by another embodiment is substantially the same as the above described embodiment except that the second transparent substrate layer 405F as the lower layer of the modulator 405 is a transparent conductive substrate layer. Specifically, the transparent conductive substrate layer 405F may be a transparent glass layer coated with a transparent conductive layer, such as transparent conductive oxide (TCO), ITO, or a transparent substrate made of a conductive material, and the transparent conductive substrate layer is required to be thin.

Figure 7:
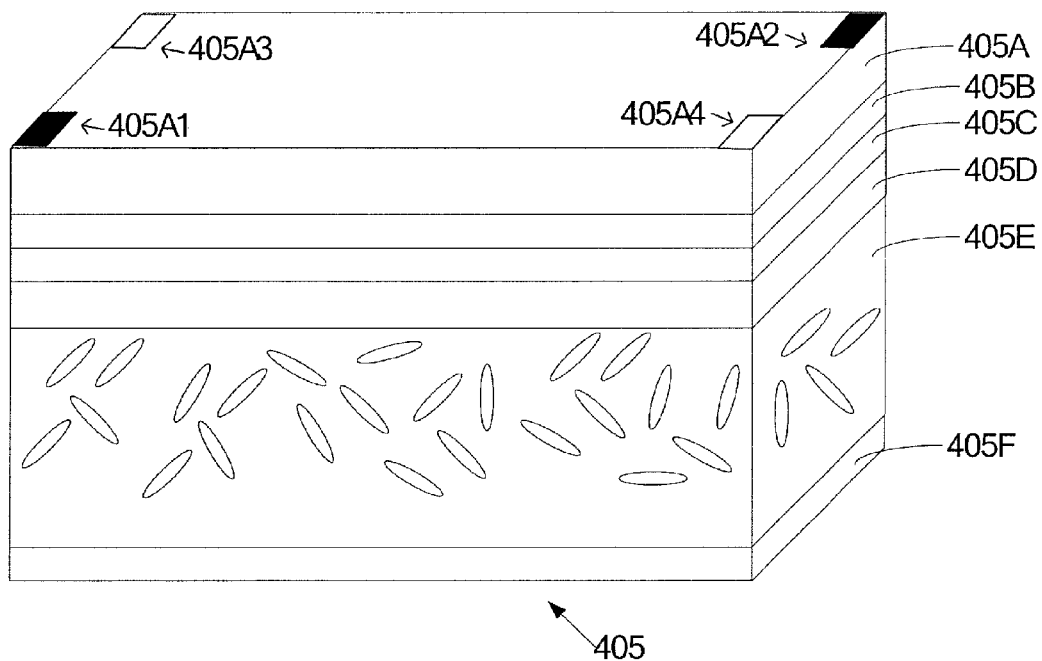
FIG. 7 is a structural schematic view of a modulator according to another embodiment of the present invention.

In addition, as shown in FIG. 7, electrodes 405A3 and 405A4 connected to the transparent conductive substrate layer 405F are further disposed on the transparent glass layer 405A as the upper layer of the modulator 405. However, the electrodes 405A3 and 405A4 disposed on the transparent glass layer 405A may not be provided, and the voltage is directly applied to the transparent conductive substrate layer 405F.

Figure 8:
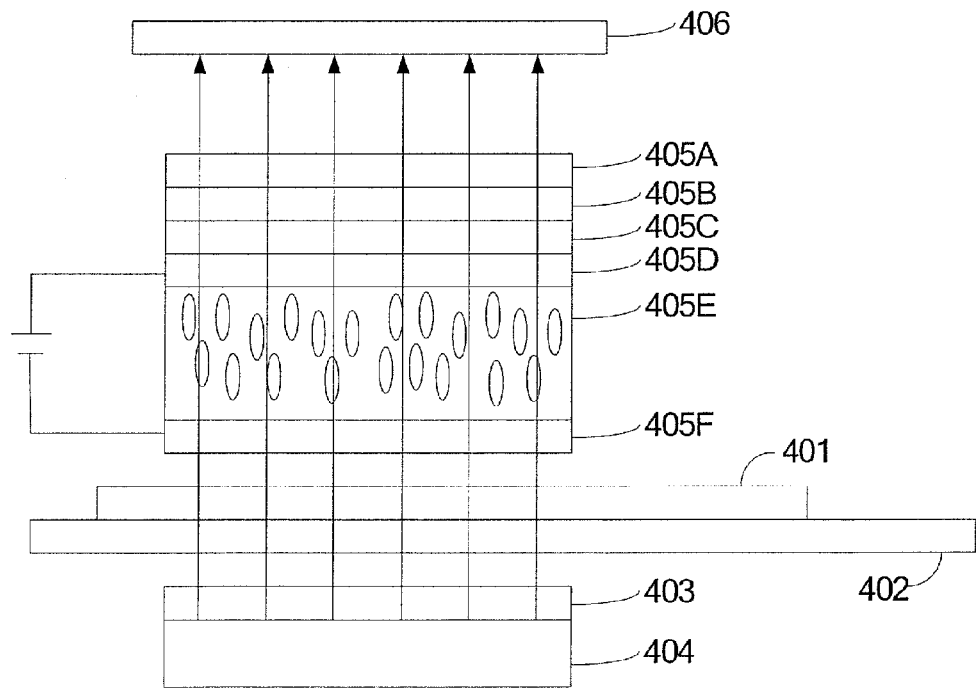
FIG. 8 is a schematic view of the detecting mechanism of a detecting method according to another embodiment of the present invention.

As shown in FIG. 8, with the electrodes 405A1, 405A2, 405A3 and 405A4, a voltage drop of about 3V~8V is applied across the transparent conductive substrate layer 405F and the ITO layer 405D of the modulator 405, and then, an electric field is generated between the ITO layer 405D and the transparent conductive substrate layer 405F, and the liquid crystal molecules in the liquid crystal layer 405E of the modulator 405 are oriented to align uniformly under the electric field so as to allow light to transmit.

Thus, when testing signals are not inputted into the TFT array substrate 401, only optical defects in the TFT array substrate 401 are detected. The light emitted from the light source 404 passes through the first polarizer 403 and changed into the parallel light with the same polarizing angles, and then, the parallel light passes through the transparent carrier 402, the TFT array substrate 401, the transparent conductive substrate layer 405F, the liquid crystal layer 405E (with the liquid crystal molecules aligned uniformly) and the second polarizer 405B of the modulator 405, and finally reach the light receiver 406.

If an optical defect occurs in a pixel of the TFT array substrate 401, which affects the aperture ratio of the pixel, and when the light emitted from the light source 404 passes through the pixel with the optical defect, light transmittance amount may be more or less than the normal light transmittance amount, and thus, the light intensity sensed by the light receiver 406 may vary, and then, with a computer or the like, the position of the optical defect in the TFT array substrate 101 to be detected can be determined based on the sensed light intensity.

Further, in the above two embodiments, the modulator with the transparent conductive substrate as a lower layer is used. Firstly, a voltage is applied across the ITO layer and the TFT array substrate to be detected to detect electric defects in the TFT array substrate, and after the information is recorded, a voltage is further applied across the ITO layer and the transparent conductive substrate to detect the optical defects in the TFT array substrate. Thus, the electric defects and the optical defects in the TFT array substrate can be distinguished by two detecting processes.

With the apparatus for detecting the TFT array substrate provided by embodiments, the detecting process can be simplified, and the detecting efficiency can be improved.

If the modulator is relatively smaller than the TFT array substrate to be detected, the modulator can be moved in many times (for example, in a step scan manner) on the TFT array substrate to be detected to conduct the detection.

Correspondingly, a detecting method for a TFT array substrate is provided in an embodiment. A light source is disposed on one side of a transparent carrier used to support a substrate to be detected, and on the other side of the transparent carrier, a modulator is disposed parallel to the transparent carrier; the modulator comprises a liquid crystal layer and two transparent substrate layers respectively disposed on both sides of the liquid crystal layer, of which one transparent substrate layer away from the transparent carrier is a transparent conductive substrate layer, and a second polarizer is disposed on the transparent conductive substrate layer. The transparent conductive layer may be a transparent glass coated with a transparent conductive layer, such as an ITO layer.

The detecting method comprises the following steps.

S901, loading the TFT array substrate to be detected on the transparent carrier.

S902, forming an electric field in the space in which the modulator is disposed so as to orient the liquid crystal molecules.

In one example, a voltage of about 250V~300V may be applied to the ITO layer of the modulator, and a voltage of about −18V~30V may be applied to a pixel electrode of the TFT array substrate to be detected, and thus, the electric field with a voltage drop of about 250V~270V is formed between the modulator and the pixel electrode of the TFT array substrate, the liquid crystal molecules in the liquid crystal layer of the modulator are oriented to align uniformly under the electric field so as to allow light to transmit.

Alternatively, when the transparent substrate layer of the modulator adjacent to the transparent carrier is a transparent conductive substrate layer, a voltage drop of about 3V~8V may be generated between two transparent conductive substrate layers, that is, the ITO layer and the lower transparent conductive substrate layer of the modulator so that an electric filed is formed above the modulator to orient the liquid crystal molecules. The transparent conductive substrate layer may be a be a transparent glass coated with a transparent conductive layer, such as transparent conductive oxide (TCO), ITO, or a transparent substrate made of a conductive material, and the transparent conductive substrate layer is required to be thin.

S903, transmitting the light from the light source through the first polarizer to vertically radiate on the transparent carrier.

The polarized light transmitted through the first polarizer is parallel to the polarized light transmitted through the second polarizer in polarization direction, and thus, when the liquid crystal molecules are oriented to align uniformly under the electric field, the light can pass through the first polarizer and the second polarizer sequentially.

S904, receiving the light transmitted through the transparent carrier, the TFT array substrate to be detected and the modulator.

The position of the defect in the TFT array substrate to be detected is detected based on the intensity of the received light.

When an electric field is formed between the modulator and the TFT array substrate to be detected to orient the liquid crystal molecules, optical defects and electric defects of the TFT array substrate can be detected; when an electric field is formed above the modulator to orient the liquid crystal molecules, only the optical defects of the TFT array substrate can be detected. Thus, with the above two detecting processes, the electric defects and the optical defects in the TFT array substrate can be distinguished.

Accordingly, with only one detecting apparatus in the embodiment, the TFT devices with electric defects and/or optical defects can be detected, which simplifies the detecting procedures and improves the detecting efficiency.

The embodiments of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. An apparatus for detecting an array substrate, comprising:
    a transparent carrier for supporting an array substrate to be detected thereon;
    a light source disposed on one side of the transparent carrier;
    a modulator disposed on the other side of the transparent carrier in parallel with the transparent carrier and comprising a liquid crystal layer and two transparent substrate layers disposed on both sides of the liquid crystal layers, wherein one transparent substrate layer away from the transparent carrier is a first transparent conductive substrate layer, and a second polarizer is disposed on the first transparent conductive substrate layer;
    a first polarizer disposed between the light source and the transparent carrier, so that light emitted from the light source is transmitted through the first polarizer to radiate on the transparent carrier; and
    a light receiver receiving the light emitted from the light source and then transmitted through the transparent carrier, the array substrate to be detected and the modulator.

2. The apparatus for detecting an array substrate of claim 1, wherein the first transparent conductive substrate layer is a transparent glass coated with a transparent conductive layer.

3. The apparatus for detecting an array substrate of claim 2, wherein the transparent conductive layer and the second polarizer are respectively disposed on the same one side away from the transparent carrier or two opposite sides of the transparent substrate layer.

4. The apparatus for detecting an array substrate of claim 1, wherein the first polarizer is disposed on the light source.

5. The apparatus for detecting an array substrate of claim 1, wherein the transparent substrate layer of the modulator adjacent to the transparent carrier is a second transparent conductive substrate layer.

6. The apparatus for detecting an array substrate of claim 5, wherein the second transparent conductive substrate layer is a transparent glass coated with a transparent conductive layer.

7. The apparatus for detecting an array substrate of claim 6, wherein electrodes are disposed on a surface of the modulator for applying a voltage to the second transparent conductive substrate layer.

8. The apparatus for detecting an array substrate of claim 7, wherein electrodes are disposed on the surface of the modulator for applying a voltage to the first transparent conductive substrate layer.

9. The apparatus for detecting an array substrate of claim 1, wherein a polarizing direction of the polarized light transmitted through the first polarizer is parallel to that of the polarized light transmitted through the second polarizer.

10. The apparatus for detecting an array substrate of claim 1, wherein electrodes are disposed on a surface of the modulator to apply a voltage to the first transparent conductive substrate layer.

11. A method for detecting an array substrate, comprising:
    loading an array substrate to be detected on a transparent carrier;
    providing a light source on one side of the transparent carrier and a first polarizer between the light source and the transparent carrier;
    providing a modulator on the other side of the transparent carrier in parallel with the transparent carrier, the modulator comprising a liquid crystal layer and two transparent substrate layers disposed on both sides of the liquid crystal layers, wherein one transparent substrate layer away from the transparent carrier is a first transparent conductive substrate layer, and a second polarizer is disposed on the first transparent conductive substrate layer;
    forming an electric field in a space in which the modulator is disposed to orient liquid crystal molecules in the liquid crystal layer;
    transmitting the light emitted from the light source through the first polarizer to vertically radiate on the transparent carrier; and
    receiving the light transmitted through the transparent carrier, the array substrate to be detected and the modulator.

12. The method for detecting an array substrate of claim 11, wherein forming the electric field in a space in which the modulator is disposed to orient liquid crystal molecules in the liquid crystal layer comprises:
    applying a voltage across the first transparent conductive layer of the modulator and a pixel electrode of the array substrate to be detected, and inputting testing signals into gate lines and data lines of the array substrate to be detected, and thus, forming the electric field in a space in which the modulator is disposed to orient liquid crystal molecules in the liquid crystal layer.

13. The method for detecting an array substrate of claim 12, wherein a voltage drop between the first transparent conductive layer and the pixel electrode of the array substrate to be detected is 250V~270V.

14. The method for detecting an array substrate of claim 11, wherein the transparent substrate layer adjacent to the transparent carrier of the modulator is a second transparent conductive substrate layer, and forming the electric field in a space in which the modulator is disposed to orient liquid crystal molecules in the liquid crystal layer comprises:
    applying a voltage across the first transparent conductive layer and the second transparent conductive layer of the modulator to form the electric field above the modulator to orient the liquid crystal molecules.

15. The method for detecting an array substrate of claim 14, wherein a voltage drop between the first transparent conductive layer and the second transparent conductive layer is 3V~8V.

16. The method for detecting an array substrate of claim 11, further comprising: determining whether a defect occurs based on the intensity of the light received.

* * * * *